US011755963B1

(12) United States Patent
Avital

(10) Patent No.: US 11,755,963 B1
(45) Date of Patent: Sep. 12, 2023

(54) VACATION PACKAGES WITH AUTOMATIC ASSISTANT

(71) Applicant: priceline.com LLC, Norwalk, CT (US)

(72) Inventor: Jacob Koby Avital, Kirkland, WA (US)

(73) Assignee: priceline.com LLC, Norwalk, CT (US)

( * ) Notice: Subject to any disclaimer, the term of this patent is extended or adjusted under 35 U.S.C. 154(b) by 744 days.

(21) Appl. No.: 16/373,540

(22) Filed: Apr. 2, 2019

Related U.S. Application Data

(60) Provisional application No. 62/651,596, filed on Apr. 2, 2018.

(51) Int. Cl.
G06Q 10/02 (2012.01)
G06F 3/0482 (2013.01)
G06F 3/0484 (2022.01)

(52) U.S. Cl.
CPC ......... *G06Q 10/025* (2013.01); *G06F 3/0482* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 6,442,526 B1* | 8/2002 | Vance | ..................... | G06Q 10/02 705/30 |
| 2002/0131565 A1* | 9/2002 | Scheuring | ............ | G06Q 10/109 379/88.19 |
| 2007/0005235 A1* | 1/2007 | Suzuki | ............... | G01C 21/3617 701/532 |
| 2007/0143155 A1* | 6/2007 | Whitsett | .............. | G06Q 10/047 705/5 |
| 2007/0185744 A1* | 8/2007 | Robertson | .............. | G06Q 10/02 705/5 |
| 2008/0091482 A1* | 4/2008 | Whitsett | ................ | G06Q 10/02 705/6 |
| 2011/0118976 A1* | 5/2011 | Harding | ............. | G01C 21/3679 701/533 |
| 2011/0213787 A1* | 9/2011 | Cerny | ................. | G06F 16/9535 707/749 |
| 2013/0122937 A1* | 5/2013 | Meyer | ................ | G06Q 30/0269 455/456.3 |
| 2015/0057837 A1* | 2/2015 | Moore, Jr. | ......... | G06Q 30/0645 701/2 |
| 2015/0073868 A1* | 3/2015 | Garman | ................. | G06Q 40/04 705/7.31 |
| 2015/0168150 A1* | 6/2015 | Kahn | ..................... | G01C 21/00 701/408 |
| 2017/0098144 A1* | 4/2017 | Gupta | .................. | G06K 19/042 |
| 2018/0276571 A1* | 9/2018 | Poddar | ................... | G06Q 10/02 |

* cited by examiner

*Primary Examiner* — Mandrita Brahmachari
(74) *Attorney, Agent, or Firm* — McDermott Will & Emery LLP

(57) ABSTRACT

In an embodiment, a method comprises: receiving, from a user computing device, digital data indicating one or more selected trip elements in association with a particular trip; adding the one or more selected trip elements to a stored data record representing the particular trip; analyzing the one or more selected trip elements to determine, based at least on analysis of the one or more selected trip elements, a trip intent associated with the particular trip; identifying, based on the trip intent, one or more suggested trip elements for the particular trip; and causing the one or more suggested trip elements to be displayed in a graphical user interface of the user computing device.

20 Claims, 12 Drawing Sheets

VACATION PACKAGES WITH AUTOMATIC ASSISTANT

BENEFIT CLAIM

This application claims the benefit of provisional application 62/651,596, filed Apr. 2, 2018, the entire contents of which is hereby incorporated by reference as if fully set forth herein, under 35 U.S.C. § 119(e).

FIELD OF THE DISCLOSURE

The present disclosure relates generally to customer-facing travel agency automation. More specifically, the disclosure relates to computer-implemented techniques for automatically suggesting or optimizing travel packages. The disclosure provides improvements in the technical fields of digital search, bandwidth and resource optimization, and machine learning.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Travel programs, websites or applications may allow a user to plan a trip by searching for and booking individual travel items, such as hotel rooms, flights, transportation, rental cars, and etc. "User," in this context, refers to a user account or networked computing device. A user may search for travel items based on a limited set of search criteria, such as travel date, target price, and destination. Alternately, a user may provide a category, such as "popular wedding destinations" or "family vacation." One or more suggested or featured items may be offered at a discounted price, or fixed packages of travel items may be offered at a price less than the sum of individual items.

However, factors such as travel dates, mode of transportation, origin location, destination location, or intermediate locations may affect the pricing and availability of travel items, including those offered as a package. For example, if the user changes the dates of a flight, then the price of the flight changes and the price and availability of hotel rooms will also change. Additionally, some packages may only be offered for certain dates.

Depending on the number of travel items the user is interested in and the number of factors the user can adjust, the possible of options and combinations available to the user can increase exponentially. A user may be overwhelmed by the number of choices, and may not be able to identify the most cost-effective or optimal combination. Consequently, existing systems result in excessive use of network bandwidth, storage, and CPU operations involved in transmitting messages, storing search results, forming and transmitting dynamic pages, and manipulating a user interface to obtain data. All these effects impose increased resource burdens on the service or entity that is providing the travel search service or booking service.

SUMMARY OF THE INVENTION

The appended claims may serve as a summary of the invention.

BRIEF DESCRIPTION OF THE DRAWINGS

In the drawings:

FIG. 2A, FIG. 2B, FIG. 2C, FIG. 2D, FIG. 2E, FIG. 2F, FIG. 2G, FIG. 2H, FIG. 2I, FIG. 2J depict example graphical user interfaces that may be generated by a booking application for display using computer display devices, according to one embodiment.

DETAILED DESCRIPTION

Figure 1:
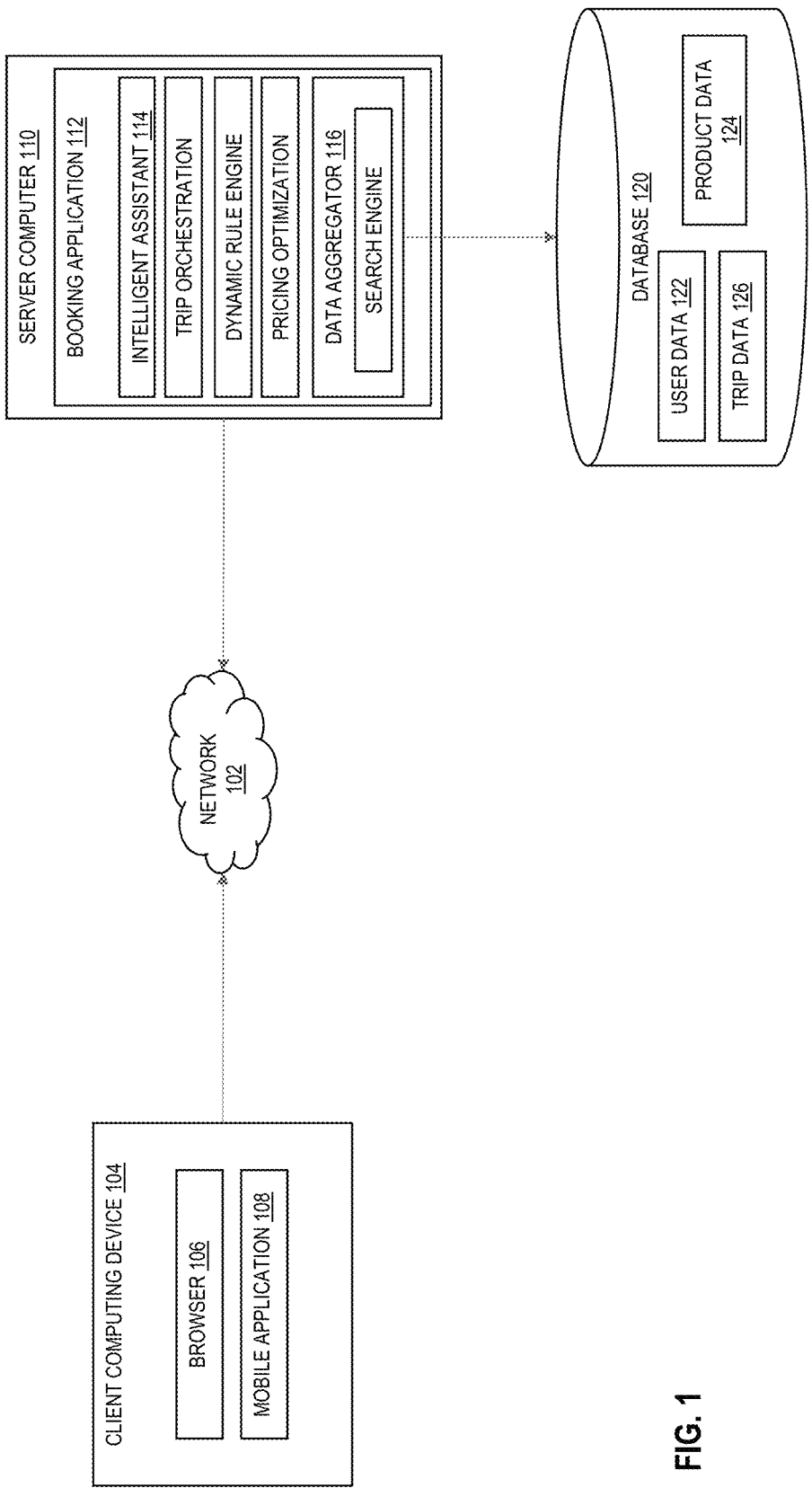
FIG. 1 is a block diagram illustrating an example system in which the techniques described herein may be practiced, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Generally, embodiments provide computer-implemented methods, digital computer systems, and programs for digital computer systems that are configured or programmed to provide a travel booking system for searching, managing, and booking trips. In an embodiment, each trip is digitally represented using a programmatic object in memory and/or a record in a database table.

Embodiments are disclosed in sections according to the following outline:
  1.0 GENERAL OVERVIEW
  2.0 OVERVIEW OF EXAMPLE DATA PROCESSING SYSTEM
    2.1 CLIENT COMPUTING DEVICE
    2.2 SERVER COMPUTER
    2.3 STORAGE DEVICE
    2.4 TRAVEL BOOKING APPLICATION
      2.4.1 DATA AGGREGATOR
      2.4.2 INTELLIGENT ASSISTANT
  3.0 TRIP DASHBOARD
    3.1 TRIP VALIDATION
    3.2 ADDING/MODIFYING/REMOVING TRIP ELEMENTS
    3.3 TRIP BOOKING
  4.0 PROCESS OVERVIEW
  5.0 IMPLEMENTATION EXAMPLE—COMPUTER HARDWARE OVERVIEW 1.0 General Overview A trip comprises one or more trip elements. A trip element may be a digital dataset or value representing or identifying any type of travel product, such as accommodations, transportation, events, or attractions. A trip may include an origin location and one or more destination locations.

In an embodiment, a travel booking system includes an intelligent assistant, which is an artificial intelligence program or module that suggests or optimizes trip elements based on a user's selections. Various aspects of the travel booking system and the intelligent assistant are described in separate sections herein.

When a traveler is planning to book a trip, the traveler typically has a particular intent in mind. The intent may be an explicit intent, such as a beach vacation for the summer, a Disney adventure package, something fun for kids, a honeymoon destination, a popular attraction, a specific festival, and etc. Alternately, the intent may be an implicit intent, such as when a traveler selects a particular destination, travel date, and/or other search parameters.

In an embodiment, an intelligent assistant is programmed or configured to determine a user's intent based on one or more user selections. The user selections may be a trip category, such as a beach vacation, or the selections may be search or filter parameters. For example, if the user selects a flight to Orlando and a hotel near Disney world, the system may determine that the traveler's intent is a Disney vacation.

In an embodiment, based on the determined intent, the intelligent assistant may be programmed or configured to automatically provide guidance by suggesting additional trip components, or trip elements, to add to the trip. Additionally or alternatively, the intelligent assistant may suggest a new trip package that might fulfill the determined intent. The user may not have explicitly defined a trip intent.

Additionally or alternatively, the intelligent assistant may be programmed or configured suggest modifying existing components in an attempt to achieve the best possible trip configuration for the user's intent. The additional or modified trip elements may be based on the availability of these components and/or the user's preferences. The additional or modified trip elements may be selected based on optimizing the trip according to one or more user criteria. Example criteria include, for example, trip dates, trip destination, accommodation rating, kid-friendly trip elements, business accommodations, and etc.

In an embodiment, the intelligent assistant is programmed or configured to process and scan potential trip elements and selects one or more to offer to the user for selection. The intelligent assistant may present graphical user interface prompts that guide the user in real-time while the user is interacting with a website, application, or other booking system. Additionally or alternatively, the intelligent assistant may interact with a user offline by sending the user suggested trip elements or alternatives through email, messages, notifications, or other forms of digital communication. The suggestions may be in addition to suggestions presented by the intelligent assistant during real-time interaction with the booking system. In an embodiment, the suggestions are determined based on the user's real-time interactions with the intelligent assistant. Additionally, the suggests may be new trips, additional trip elements, or alternate trip elements that became available after the user finished interacting with the booking system.

In an embodiment, the intelligent assistant is programmed or configured to suggest trip elements or narrow a set of suggested trip elements based on a user's preferences. User preferences refers to a user's preference for travel products, such as preferred brands, accommodation or travel class (i.e. first and business class, luxury rooms, etc.), travel modes, travel purposes, and etc. A user's preferences may be pre-defined in the user's profile, derived by the booking system based on the user's search and booking history, and/or learned by the system through machine learning algorithms.

In many cases, items are in high demand and a prompt booking is required to ensure item availability. In an embodiment, when the user accepts the trip and indicates that he would like to book it, the booking system books each item with its provider. Additionally, the booking may be performed in real-time to avoid trip items selling out during the booking process.

In an embodiment, if the booking system is unable to book a specific travel item, the intelligent assistant selects an alternative option and attempts to book the alternative option. The alternative option may be equivalent to the specific travel item and/or better than the specific travel item in some aspect. Additionally, the intelligent assistant may interact with the user in real-time to secure user approval before booking the alternative option. In many cases, the intelligent assistant may resolve the booking using nearly identical travel items. This iterative booking process ensures quick completion of the user's booking request with minimal complexity and input from the user. If an item is unavailable, the user does not have to restart the search and plan a new trip.

2.0 Overview of Example Data Processing System

FIG. 1 illustrates an example computer system with which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a client computing device 104 that is coupled via a network 102 to a server computer 110, which is coupled to a storage device 120. Network 102 comprises any combination of a LAN, a WAN, one or more internetworks such as the public internet, a cellular network, a company network, or a content delivery network. The server computer 110 comprises booking application 112, intelligent assistant 114, and data interface 116. The storage device 120 may store data used by server computer 110, such as user data 122, product data 124, and trip data 126.

2.1 Client Computing Device

In one embodiment, client computing device 104 is any computing device, such as a laptop, work station, personal computer, server, hand-held computer, wearable computer, cellular or mobile phone, portable digital assistant (PDA), or tablet computer. Although a single computing device is depicted in FIG. 1, any number of computing devices may be present.

Client computing device 104 also includes other hardware elements, such as one or more input devices, memory, processors, and the like, which are not depicted in FIG. 1. Client computing device 104 also includes applications, software, and other executable instructions to facilitate various aspects of embodiments described herein. These applications, software, and other executable instructions may be installed by a user, owner, manufacturer, or other entity related to the client computing device 104.

In one embodiment, client computing device 104 includes a browser 106 that displays a travel booking web page or application interface served by server computer 110. Additionally or alternatively, client computing device 104 includes a client application 108, which is software that displays, uses, supports, or otherwise provides travel planning and booking functionality as part of the application or software.

In an embodiment, the client application 108 may implement functional calls, callbacks, methods, or other programmatic means for contacting the server computer to obtain trip data, travel product information, and user data that can form the basis of planning and booking a trip as part of the application. Additionally or alternatively, one or more functions attributed to the server computer 110 below may be implemented by client application 108. For example, client application 108 may be programmed or configured with an intelligent assistant module that provides trip element suggestions.

In an embodiment, client computing device 104 is a server computer that processes trip data and/or travel product data received from server computer 110, and provides the data to other programs, applications, or computing devices. For example, a client computing device 104 may be a server computer that serves web pages for a travel agency. The client computing device may request travel product data from server computer 110, process the travel product data, and generate a travel agency web page that displays one or more travel products. Additionally, the client computing device may communicate with server computer 110 to book one or more selected travel products.

2.2 Server Computer

Server computer 110 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 110 broadly represents one or multiple server computers, such as a server cluster, and the server computer may be located in one or more physical locations. Server computer 110 also may represent one or more virtual computing instances that execute using one or more computers in a datacenter such as a virtual server farm.

Server computer 110 may host or execute a travel booking application or may serve one or more travel booking web pages. Additionally or alternatively, server computer 110 may provide travel booking information to other computing devices, applications, or software, and facilitate travel booking by other computing devices, applications, or software. For example, server computer 110 may include one or more application programming interfaces (APIs) for requesting travel booking information, such as trip data, product data, and/or user data. Additionally, server computer 110 may include other applications, software, and other executable instructions to facilitate various aspects of embodiments described herein.

In one embodiment, storage device 120 is a data storage subsystem consisting of programs and data that is stored on any suitable storage device such as one or more hard disk drives, memories, or any other electronic digital data recording device configured to store data. Although storage device 120 is depicted as a single device in FIG. 1, storage device 120 may span multiple devices located in one or more physical locations. For example, storage device 120 may include one or nodes located at a data warehouse(s). Additionally, in one embodiment, storage device 120 may be located on the same device(s) as server computer 110. Alternatively, storage device 120 may be located on a separate device(s) from server computer 110.

2.3 Storage Device

In an embodiment, storage device 120 is communicatively connected with server computer 110 through any kind of computer network using any combination of wired and wireless communication of the type previously described. Alternatively, storage device 120 may be directly connected to server computer 110. Optionally, storage device 120 may be communicatively connected with other components, either directly or indirectly, such as one or more third-party data suppliers. Generally, storage device 120 stores data related to travel planning including, but not limited to: trip object data 126, travel product data 124, and user data 122. These datasets may be stored as columnar data in a relational database, as flat files, or in other data formats.

In an embodiment, trip object data 126 is digital data that is stored or received when users plan and/or book trips. Trip object data 126 stores users' trip information and may include data indicating one or more trip elements for each trip. A trip element may be, for example, hotel, transportation, event, or attraction. A trip element may include travel product data, such as travel product data 124, or data indicating a travel product from travel product data 124. Trip object data may also include trip identification information and user information indicating one or more users associated with a trip.

In an embodiment, trip object data 126 includes a working data set. The working data set comprises one or more search result data sets. The working data set may be used by the booking application to construct trips and/or iterate trip element suggestions, selections, and/or searches. The working data set may comprise one or more trip element options and/or one or more trip package options. For example, the working data set may include a plurality of trip packages generated by the intelligent assistant 114 that were presented to a user. User selections of trip elements or trip packages from the working data set may be stored in the working data set. The user selections may be used to further determine suggested trip elements or trip packages.

In an embodiment, travel product data 124 is digital data describing travel products available for booking. The travel products may be from a travel provider or agency, such as an entity associated with booking application 112, or from one or more third-party travel providers not directly associated with booking application 112. Example third-party providers include hotels, airlines, car rental companies, public or private transportation providers, restaurants, etc.

Data for a travel product may include product properties, product availability dates, product provider information, and product booking information. Product properties include features that describe the travel product. For example, properties of accommodations include star rating, location, available rooms and room types, cost, and amenities. As another example, properties of transportation include travel time, travel mode, route, and cost. Product booking information may indicate, for example, whether the travel product may be placed on hold when the travel product is added as a trip element.

In an embodiment, travel product information may be requested or retrieved from one or more third-party travel providers using plug-ins, API calls, or other programmatic means for receiving information from third-party providers. Additionally or alternatively, product data for third-party travel products may be requested or retrieved from third-party providers when a user is planning a trip, such as when a user searches for travel products, adds trip elements, or modifies trip elements. The travel product information may be stored in travel product data 124, or may be requested on-demand when searching for travel products.

Additionally, the booking system 100 communicates with third-party providers to book third-party travel products. In an embodiment, booking system 100 receives payment information from a user booking a trip and facilitates payment and booking for each trip element that is a third-party travel product.

In an embodiment, user data 122 is digital data storing user information. User data may include user information such as name, address(es), family information, and user preferences such as preferred transportation mode, vehicle type, airfare class, hotel rating, price range(s), etc. Additionally, user data may include customer transaction data such as search history, booking and reservation history, browsing history. Search history may include search filters used, locations, dates, results selected, search results that generated bookings, search result sort order, etc. Browsing history includes travel products viewed or clicked, web pages or links navigated, and other user behavior while using the booking application. Additionally, user data may include trip data indicating a user's currently booked or saved trips. As referred to herein, a saved trip is a trip whose data is stored by system 100, but whose trip elements have not been booked or confirmed.

2.4 Travel Booking Application

In an embodiment, travel booking application 112 provides an API that may be assessed, for example, by mobile application 108 to provide travel booking functionality to mobile application 108. Additionally or alternatively, travel booking application 112 receives requests for web pages from client computing device 104 and serves one or more travel planning web pages that may be displayed in browser 106.

Specifically, booking application 112 comprises program instructions that are programmed or configured to perform a variety of backend functions needed for travel planning or booking including, but not limited to: receive travel search requests, search data stored in storage device 120 or other travel provider information for travel products, provide search result sets to users, receive and store user data, store trip data in association with users, receive or request travel product information from third party providers, facilitate booking of trips, process booking payment information, and any other aspects of embodiments described herein.

In an embodiment, booking application 112 comprises a trip orchestration component. The trip orchestration component constructs trip data in a user-presentable way, based on the client platform. Additionally, the trip orchestration component may help manage trip components and apply business logic to support the presentation layers in client devices.

In an embodiment, booking application 112 comprises a dynamic rule engine. In an embodiment, the dynamic rule module is programmed or configured to apply one or more rules when determining trip packages. The rules may be logical rules, such as temporal connections between travel elements. Additionally, the rules may be business rules, such as rules constraining the trip products that may be provided in a trip package. In an embodiment, one or more rules are externally constructed and dynamically loaded to the trip framework. This allows frequent updates of a rule set without re-building or re-compiling the application.

In an embodiment, booking application 112 comprises a pricing optimization module. In an embodiment, the pricing optimization module is programmed or configured to determine prices for trip elements. The determination may be performed on-demand, at periodic intervals, or when a travel product is added to the system. In an embodiment, the pricing optimization module makes a pricing decision based on a variety of pricing models. The pricing optimization module may be configured to provide a customer the lowest price possible based on, for example, pricing agreements with trip element providers, revenue, price margins, and other such factors.

2.4.1 Data Aggregator

In an embodiment, booking application 112 comprises a data aggregator 116. In one embodiment, data aggregator 116 is programmed or configured to retrieve data from various sources, such as storage device 120 and other storage devices or servers. In an embodiment, data aggregator 116 is programmed or configured to retrieve data from one or more travel product providers. For example, data aggregator 116 may use an API of a third-party travel provider to retrieve travel product information from the third-party travel provider.

In an embodiment, data aggregator 116 comprises a search engine. Additionally or alternatively, data aggregator 116 is programmed or configured to communicate with a search engine. The data aggregator may translate a request for data into one or more search commands for the search engine to retrieve and collected the requested data. The search engine receives trip element search requests, determines an optimal retrieval result set per trip element, and acquires the requested data. Additionally, the search engine may be configured to interact with third-party travel product providers as discussed above for the data aggregator. In an embodiment, the search engine stores retrieved data in cache memory for further processing by the data aggregator. Additionally, the search engine may be optimized to run parallel searches and/or continuous data retrieval.

In an embodiment, data aggregator 116 is further programmed or configured to process retrieved data and send the processed data to other processes, applications, and/or program modules, such as booking application 112 or client application 108. For example, data aggregator 116 may process a result set provided by a search engine into a data format that can be utilized by booking application 112.

2.4.2 Intelligent Assistant

In an embodiment, travel booking application 112 includes intelligent assistant 114, which is programmed or configured to suggest one or more trip elements of a trip for a user. In an embodiment, intelligent assistant 114 is programmed or configured to receive one or more selected trip elements, analyze the one or more selected trip elements, and based on the analysis, determine one or more suggested trip elements. A suggested trip element may be in addition to the one or more selected trip elements or an alternative to the one or more selected trip elements. The suggested trip elements may be selected from available travel products, such as from travel product data 124.

In an embodiment, analyzing the one or more selected trip elements comprises determining one or more travel products that are similar to the one or more selected trip elements. Determining similar travel products may be based on product properties, user ratings, and price. The user ratings may be ratings by other users and/or ratings by the user planning the trip.

Additionally or alternatively, determining similar travel products may be based on one or more search or filter parameters. A user may have performed a search and/or filtered a list of travel products before selecting a trip element. A suggested trip element may be selected from the search results or filtered list. For example, a user may have searched for hotels in a particular city for a particular date range. The suggested trip element may be selected from travel products that are located in the particular city and available during the particular date range.

In an embodiment, analyzing the one or more selected trip elements comprises determining one or more travel products that are complimentary to the one or more selected trip elements. Additionally or alternatively, any combination of complementary and alternative travel products may be selected. Complimentary travel products may include other travel product types that can be booked with the selected trip elements. For example, assume a user selects a flight from New York to Miami. Transportation, accommodations, events, and attractions in Miami may be selected as suggested trip elements. Complimentary travel products may be selected based on, for example, travel date, search or filter parameters, user preferences.

In an embodiment, complimentary travel products include short-term travel products such as hourly accommodations, events with particular start and end times, hourly transportation rentals, dining, and tours. Selecting complimentary short-term travel products may include analyzing start and end times for other selected or suggested travel products and determining if the trip schedule accommodates or prefers a short-term travel product. For example, a trip may include a selected flight that arrives at 6 A.M. and a hotel with a check-in time of 3 P.M. An hourly room rental option may be suggested for 7 A.M. to noon, and a restaurant reservation may be suggested for 12:30 P.M.

Additionally, one or more travel products of the same type may be combined as suggested alternative travel element for a selected trip element. For example, assume a user selects a flight from New York to Miami. Intelligent assistant may determine that a combination of a flight to Ft. Lauderdale and a taxi ride from Ft. Lauderdale airport to Miami has a similar travel time but a cheaper price, and provide the combination as suggested travel elements.

In an embodiment, intelligent assistant 114 is programmed or configured to receive an origin and/or destination location and determine one or more suggested trip elements based on the origin and/or destination location. Additionally or alternatively, intelligent assistant 114 may receive a route, or calculate a route based on an origin and destination location, and determine one or more suggested trip elements based on the route. Determining one or more suggested trip elements based on the route may comprise one or more of: identifying one or more potential stops, identifying one or more alternate routes, and one or more potential stops along the one or more alternate routes.

In an embodiment, intelligent assistant 114 is programmed or configured to receive a trip category and determine one or more suggested trip elements based on the trip category. A trip category may be a destination location such as a city or attraction, a destination type such as 'beach' or 'ski,' a vacation duration such as 'week,' 'weekend,' 'long weekend,' a vacation type such as 'family' or 'romantic,' and etc. Additionally or alternatively, a trip category may be automatically identified based on one or more of: trip origin, trip destination, one or more selected trip elements, trip types of trips previously booked by the user, and trip types of similar trips booked or viewed by other users. A similar trip booked or viewed by other users may have a similar origin, a similar destination, or similar trip elements. In an embodiment, determining one or more suggested trip elements based on the trip category may be based on predefined trip categories associated with the trip category. For example, particular travel products may be assigned to a particular trip category. Suggested travel elements may be selected from the particular travel products.

In an embodiment, intelligent assistant 114 is programmed or configured to determine an intent of a trip and determine one or more suggested trip elements based on the trip intent. The intent may be an explicit intent or an implicit intent. An explicit intent may comprise a trip category, as discussed above. An implicit intent may be derived based on the user's search parameters, the user's search history, and other user information.

In an embodiment, determining the implicit intent of a trip may include determining one or more of: a trip origin, a trip destination, similar trip elements, and a trip category. The determining may also be based on the user's booking, review, and search history, similar users' booking, search, and review histories, the user's stored preferences and other user information. A similar user may be a user with similar profile information such as age, location, travelling companions. Additionally or alternatively, a similar user may be a user with a similar booking or review history. For example, a similar user may have given the same rating to the same travel products, or may have a trip history similar to the user.

In an embodiment, suggested elements may be determined based on one or more of: a trip origin, a trip destination, similar trip elements, a trip category, the user's booking, review, and search history, similar users' booking, search, and review histories, the user's stored preferences and other user information.

As an example, the user's booking, review, and search history may be used to infer user preferences and/or used in conjunction with stored user preferences to identify trip elements that the user is more likely to prefer.

As another example, similar users' booking, review, and search histories may be used to identify trip elements that at least a portion of the similar users booked for similar trips. A similar trip may be, for example, a trip that was booked after selecting or searching for the same or similar trip elements, that had the same trip intent, and/or is in the same trip category.

In some embodiments, a particular intent may not be specifically identified. Rather, suggested elements are identified based on one or more factors described above, without determining a trip intent.

Additionally, the user's preferences may affect the suggested elements and/or the prices of suggested elements. For example, trip element pricing may be higher if a user prefers luxury hotel accommodations, business or first class travel, bigger or more luxurious car selections, and etc.

Additionally or alternatively, one or more suggested trip elements may be determined based on one or more trends. A trend may be, for example, popular trips for the same destination and/or time frame, events such as conventions and conferences, holidays, locations at a particular destination such as theme parks or other popular locations. The one or more trends may correspond to a user's explicit or implicit intent.

As an example, a user may specifically search for a Disneyworld vacation. Alternately, the user may be searching for travel items near Orlando, Florida during March (typically spring break season) and the user's information indicates that the user travels with kids. Based on the information, intelligent assistant 114 may determine that the user may be searching for a Disneyworld vacation. Intelligent assistant 114 may suggest alternate dates that have better prices for a trip to Disneyworld, or alternate but similar destinations. For example, intelligent assistant 114 may determine that due to an airfare deal, a trip to Disneyworld Paris during the user's search dates is cheaper than a trip to Disneyworld Orlando, and may suggest the trip to Disneyworld Paris to the user.

In an embodiment, rather than determining one or more suggested trip elements based on a trip intent, the intelligent assistant 114 is programmed or configured to filter trip elements based on trip intent. For example, intelligent assistant 114 may determine a plurality of trip elements for a particular travel date. Based on the user's search and booking history, the intelligent assistant 114 may remove a plurality of trip elements from the set of trip elements. In an embodiment, the filtering is performed based on set theory. One or more sets of trip elements are determined. Each of the one or more sets of trip elements may be filtered. Additionally, the one or more sets of trip elements may be intersected. For example, a first set may be filtered based on a user's search parameters and a second set may be filtered based on the user's booking history and/or booking preferences. The filtered sets may be intersected to produce a results set that accounts for both the user's booking history and the user's search parameters. One or more suggested trip elements may be selected from the result set.

Additionally or alternatively, each of the one or more sets of trip elements may correspond to a portion of the trip. For example, a first set may correspond to flights, a second set may correspond to lodging, and a third set may correspond to transportation. The sets may be intersected and filtered based on connection flow. For example, trip elements in the transportation set may be matched with trip elements in the flight set based on arrival time of flights compared to departure time of transportation.

In an embodiment, determining suggested trip elements may be performed, in whole or in part, by one or more machine learning models. The machine learning models may be trained to receive inputs such as selected trip elements, origin, destination, trip category, search parameters, and/or user data, and output one or more suggested trip elements.

For the purpose of illustrating a clear example, the foregoing description has ascribed certain operations, functions, and programming to the booking application 112 of FIG. 1. However, in other embodiments, the same operations, functions, and programming may be implemented in programs or logic that is separate from the booking application 112, such as a utility program or library. For example, data aggregator 116 may be implemented in a separate library, application, or module that the booking application 112 calls. As another example, the intelligent assistant 114 may be implemented in program or logic separate from booking application 112. Additionally or alternatively, operations, functions, and programming may be implemented, either as a whole or in part, in programs or logic executing on other devices, such as client computing device 104. For example, mobile application 108 may be programmed to communicate with database 120 to request trip information, or intelligent assistant 114 may be included in mobile application 108.

Additionally or alternatively, booking application 112 may communicate or interface with any other applications, software, or modules that are executed by server computer 110, such as operating systems or drivers, as needed to implement the functionality described herein.

3.0 Trip Dashboard

In an embodiment, a travel booking application or website includes a trip dashboard, which is a graphical user interface (GUI) for creating, viewing, and modifying trips. Additionally, the trip dashboard may provide GUI for receiving user input, such as search or filter parameters and trip element selections, displaying suggested trip elements to a user, and facilitating booking of a trip.

In an embodiment, the trip dashboard allows a user to begin planning or creating a trip. A user begins planning a trip using the trip dashboard by selecting a particular option, such as 'trip package,' 'hotel,' 'rental,' and 'air.' If a user selects the 'package' option, booking application 112 may create a new trip object that does not include any trip elements. Additionally or alternatively, if a user selects a trip type or a route, booking application 112 may create a new trip object that includes one or more automatically suggested trip elements. If a user selects 'hotel,' 'rental,' or 'air,' and selects a travel product, booking application 112 may create a new trip object that includes the selected travel product as a trip element. The trip object may include any search parameters that the user selected when creating the trip, such as a travel product search, selected trip type, or route information.

Additionally, the graphical user interface may provide options for a user to save a trip. Data for the trip object may be stored in database 120, such as in trip object data 126. The trip object may be stored in association with the user who created the trip. A user may view a list of saved trips, retrieve a trip, or delete trips using the trip dashboard.

In an embodiment, the trip dashboard displays information for a selected trip to the user. The trip dashboard may display a timeline or schedule for the trip, trip elements included in the trip, and a price of the trip.

The trip dashboard may also display information associated with the trip elements. In an embodiment, the price of each trip element is displayed. Additionally or alternatively, users may select a trip element to view, modify, or remove the trip element.

The trip dashboard may include search boxes or forms for searching trip products. Additionally or alternatively, the trip dashboard may include intelligent forms that guide users in trip product selection.

In an embodiment, the trip dashboard displays suggested trip elements. If a suggested trip element is an alternative for one or more existing trip elements, the trip dashboard may indicate which existing trip elements should be replaced by the suggested trip element. If a suggested trip element is in addition to the existing trip elements, the trip dashboard may indicate that the suggested trip element is an addition. For example, if the trip dashboard displays a timeline, the suggested trip element may be displayed along the timeline.

Additionally or alternatively, the trip dashboard may display one or more optimized trips based on the currently viewed trip. The plurality of trip elements may include all, some, or none of the existing trip elements.

FIG. 2A, FIG. 2B, FIG. 2C, FIG. 2D, FIG. 2E, FIG. 2F, FIG. 2G, FIG. 2H, FIG. 2I, FIG. 2J illustrate example trip dashboard graphical user interfaces that the server computer may generate, using instructions in dynamic HTML or other technologies, which are transmitted to a client computing device for interpretation or parsing, rendering and display using a computer display device.

Figure 2A:
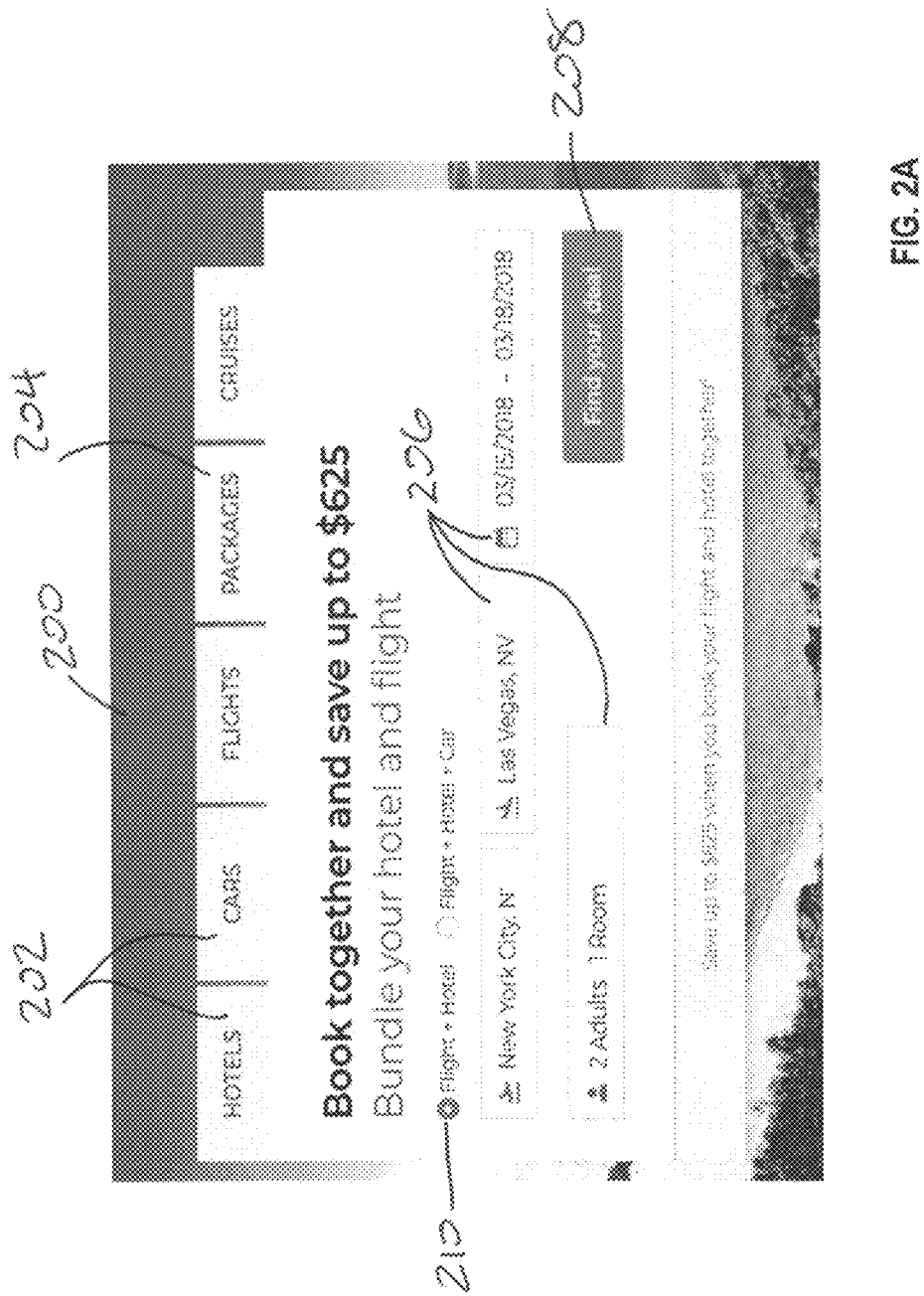

FIG. 2A illustrates an example form for searching for trip products. In the illustrated example, a search form 200 comprises a plurality of tabs 202, 204 corresponding to a plurality of respective search options. The packages tab 204 is selected, and the form 200 comprises a plurality of radio buttons 210 and search widgets 206 for selecting trip options, such as destination and dates. A graphical FIND button 208 is programmed, when selected, to cause submitting a request to the server computer that contains the values of widgets 206 and buttons 210 that have been selected via input from the client computer.

Figure 2B:
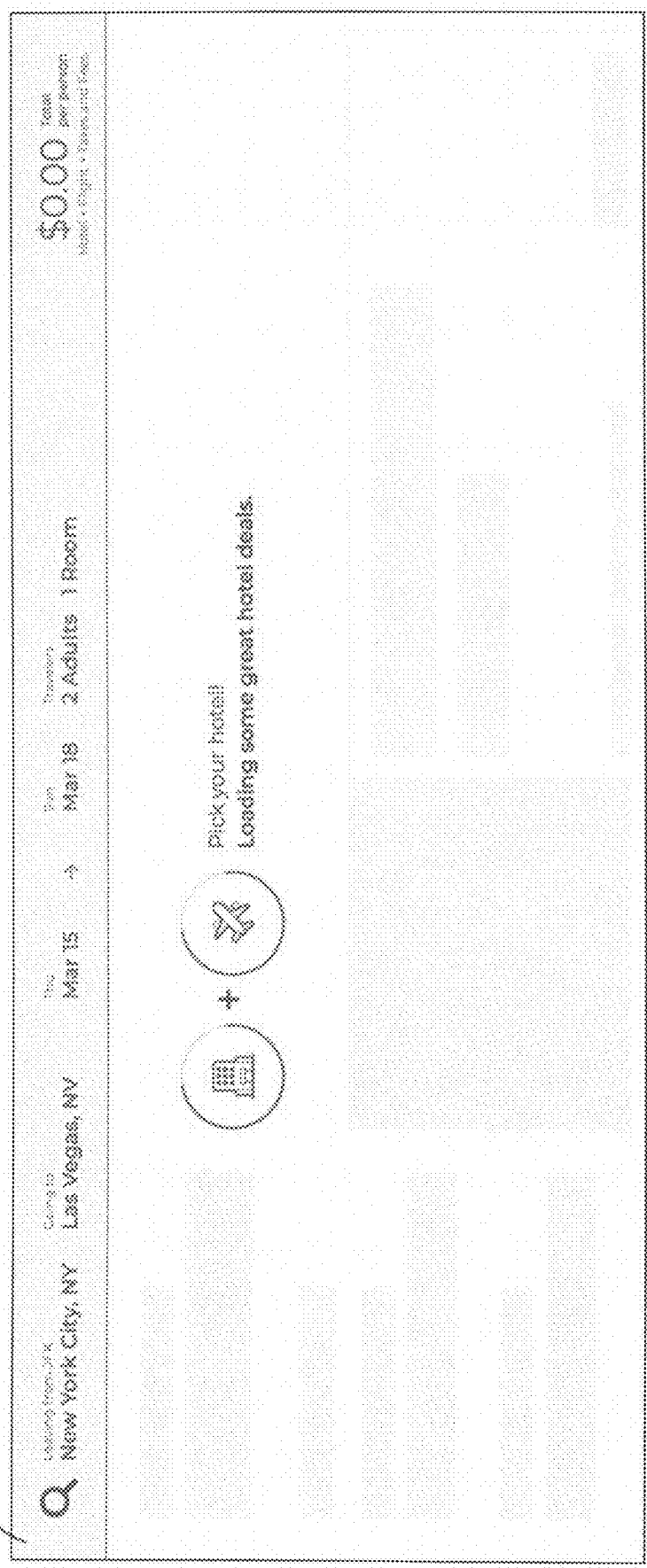

FIG. 2B illustrates an example loading screen while the intelligent assistant selects packaged hotel and flight options. In the illustrated example, loading screen 220 comprises a graphical search panel 222, which displays a plurality of search parameters. The search parameters may include the values that were selected via input from the client computer from search from 200. After hotel and/or flight options are selected by the sever computer, the results are displayed at the client computer. Selecting graphical search panel 222 may cause display of search widgets which allow modification of search parameters, such as destination or dates.

Figure 2C:
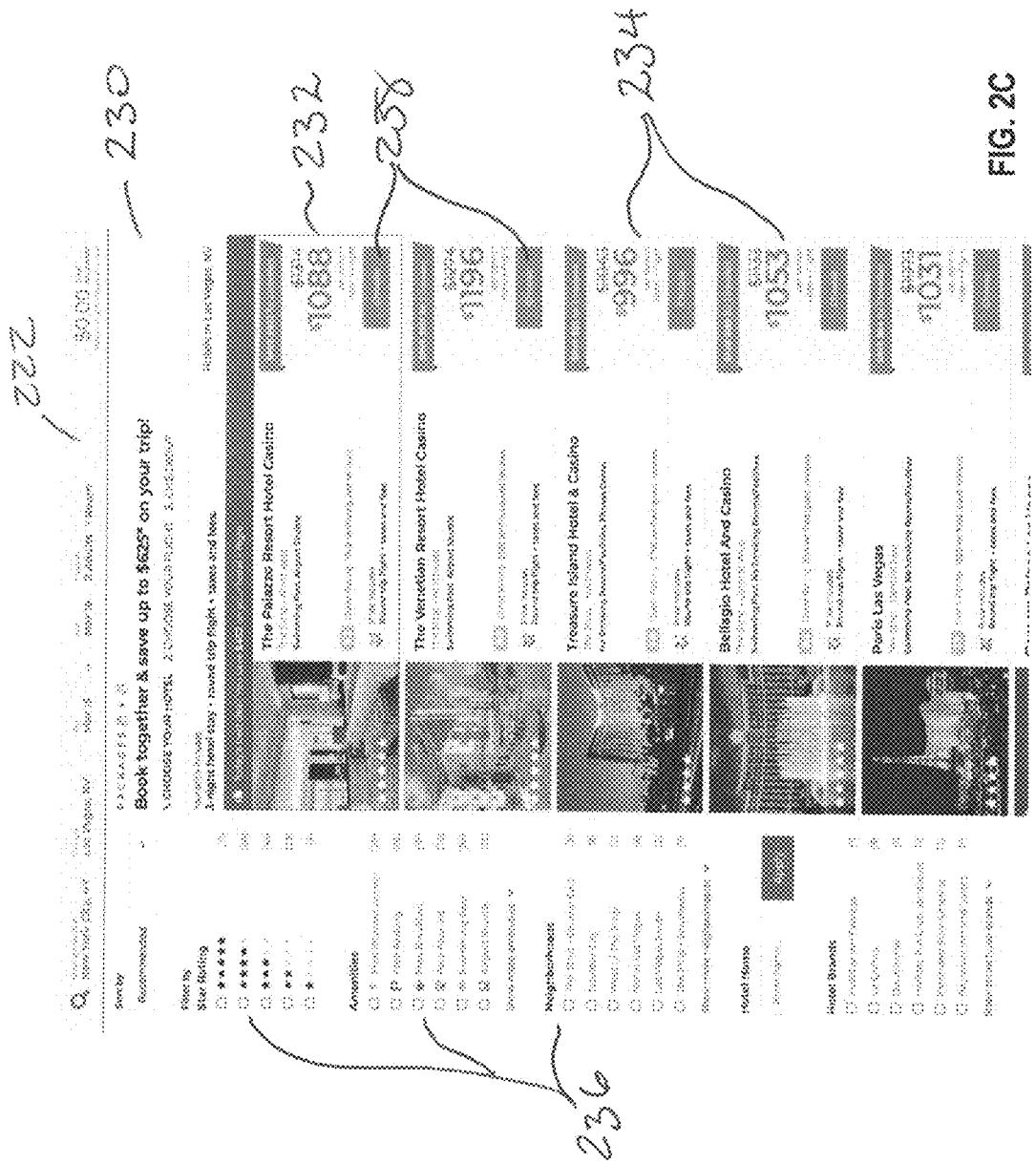

FIG. 2C illustrates an example search result screen illustrating hotel selection options. In the illustrated example, a hotel search result screen 230 comprises search panel 222, a plurality of hotel selection options 232, 234, and sort/filter widgets 236. Each hotel selection option 232, 234 corresponds to a hotel at the selected destination for the selected dates.

In FIG. 2C, a recommended hotel selection option 232 is highlighted. The recommended hotel selection option 232 may correspond to a hotel that is selected or recommended by the intelligent assistant 114. Sort/filter widgets 236 correspond to a plurality of respective sort or filter options, for sorting and/or filtering the results. The plurality of sort or filter options, when selected, cause applying selected sort and/or filter options to the set of hotel selection options.

Additionally, each hotel selection option 232, 234 is displayed with a respective graphical Choose button. The respective graphical Choose buttons are programmed, when selected, to cause submitting a request to the server computer that selects the associated hotel option. In an embodiment, in response to receiving the request, the server computer may create a new trip package that includes the selected hotel option.

Figure 2D:
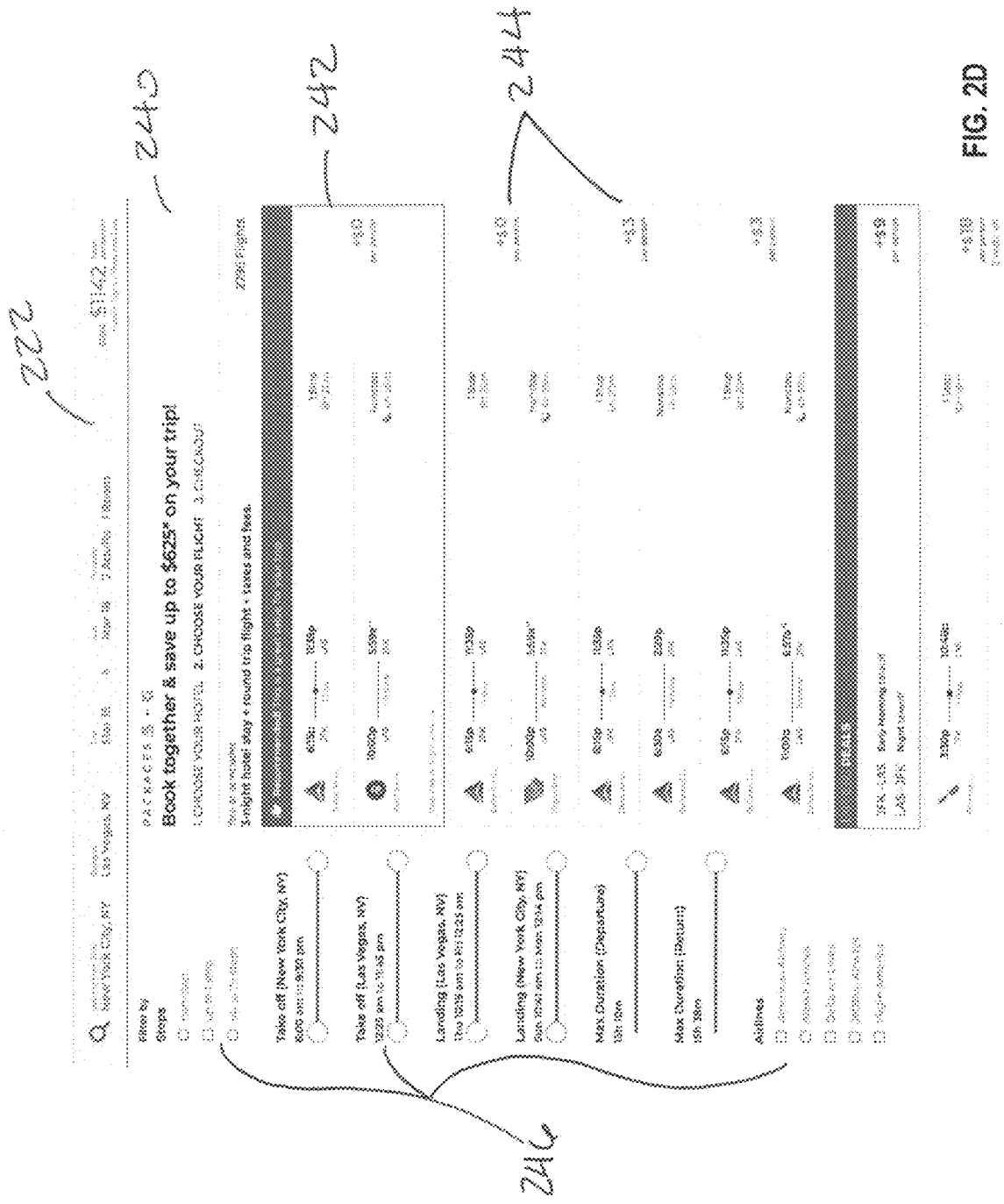

FIG. 2D illustrates an example search result screen illustrating flight selection options. In the illustrated example, a flight search result screen 240 comprises search panel 222, a plurality of flight selection options 242, 244, and sort/filter widgets 246. Each flight selection option 242, 244 corresponds to a set of flights between the selected origin and destination locations for the selected dates.

In FIG. 2D, flight selection option 242 is highlighted as a recommended option. The recommended flight selection option 242 may correspond to a flight that is selected or recommended by the intelligent assistant 114. Sort/filter widgets 246 correspond to a plurality of respective sort or filter options, for sorting and/or filtering the results. The plurality of sort or filter options are programmed, when selected, to cause applying selected sort and/or filter options to the set of flight selection options.

In an embodiment, each flight selection option 242, 244 is programmed, when selected, to cause submitting a request to the server computer that selects the associated flight option. In an embodiment, in response to receiving the request, the server computer may add the selected flight option to the trip package.

Figure 2E:
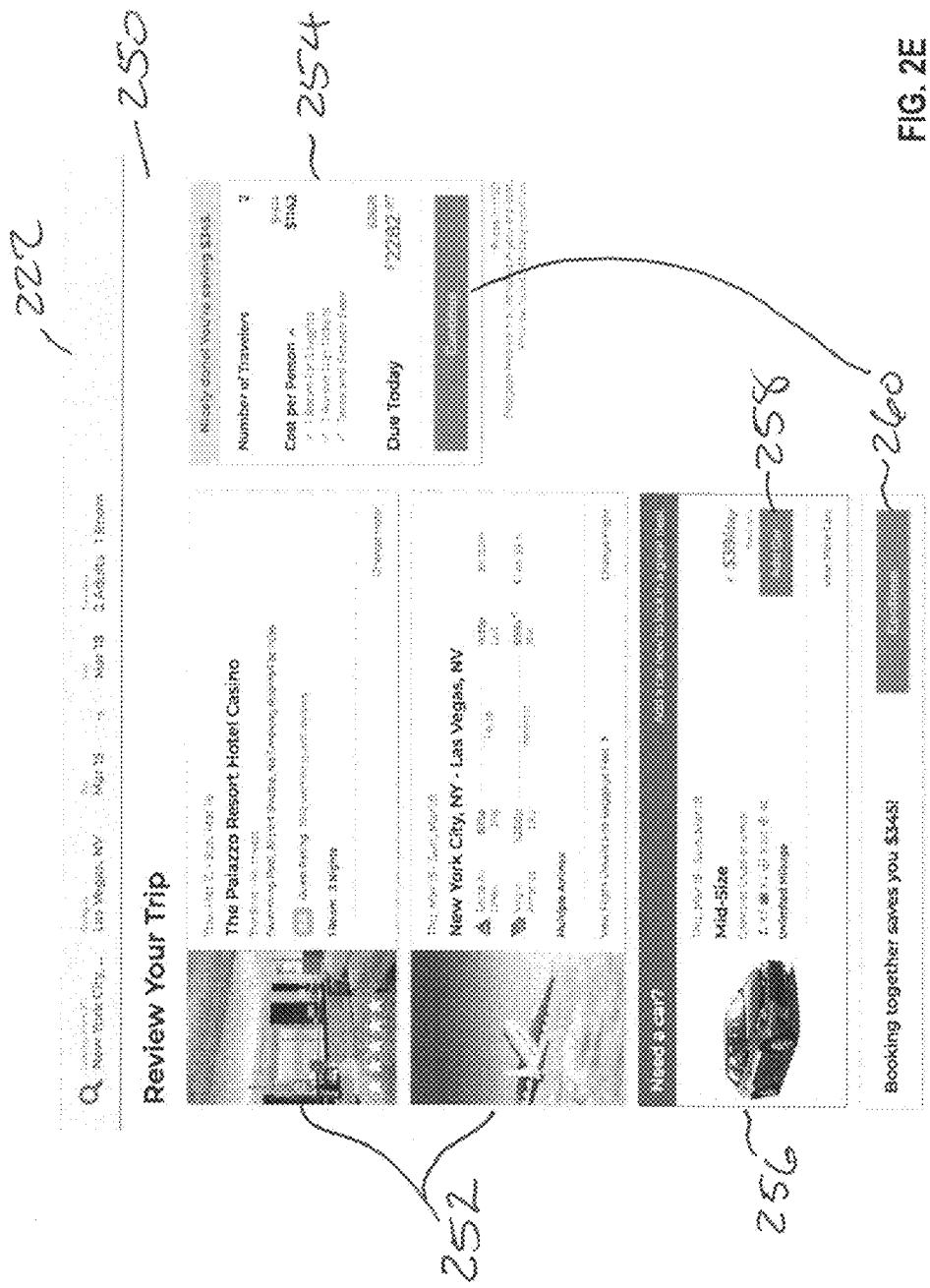

FIG. 2E illustrates an example trip overview screen. In the illustrated example, trip overview screen 250 displays trip elements 252 selected by the user, for example, in hotel search result screen 230 and flight search result screen 240, and the total cost 254 of the selected elements. Graphical Continue buttons 260 are programmed, when selected, to cause submitting a request to the server computer to initiate booking of the trip package.

In FIG. 2E, the trip overview screen 250 includes a trip element recommendation 256. The trip element recommendation 256 may display one or more recommended trip elements. The one or more recommended trip elements may be selected by intelligent assistant 114. In the illustrated example, trip element recommendation 256 is displaying a rental car recommendation. The vehicle type and duration for the rental car recommendation may be based on the traveler information and selected dates for the selected hotel and flight. In FIG. 2E, trip element recommendation 256 includes a graphical Add Car button 258 which is programmed to, when selected, cause submitting a request to the server computer that selects the recommended rental car. In an embodiment, in response to receiving the request, the server computer may add the recommended rental car to the trip package.

Figure 2F:
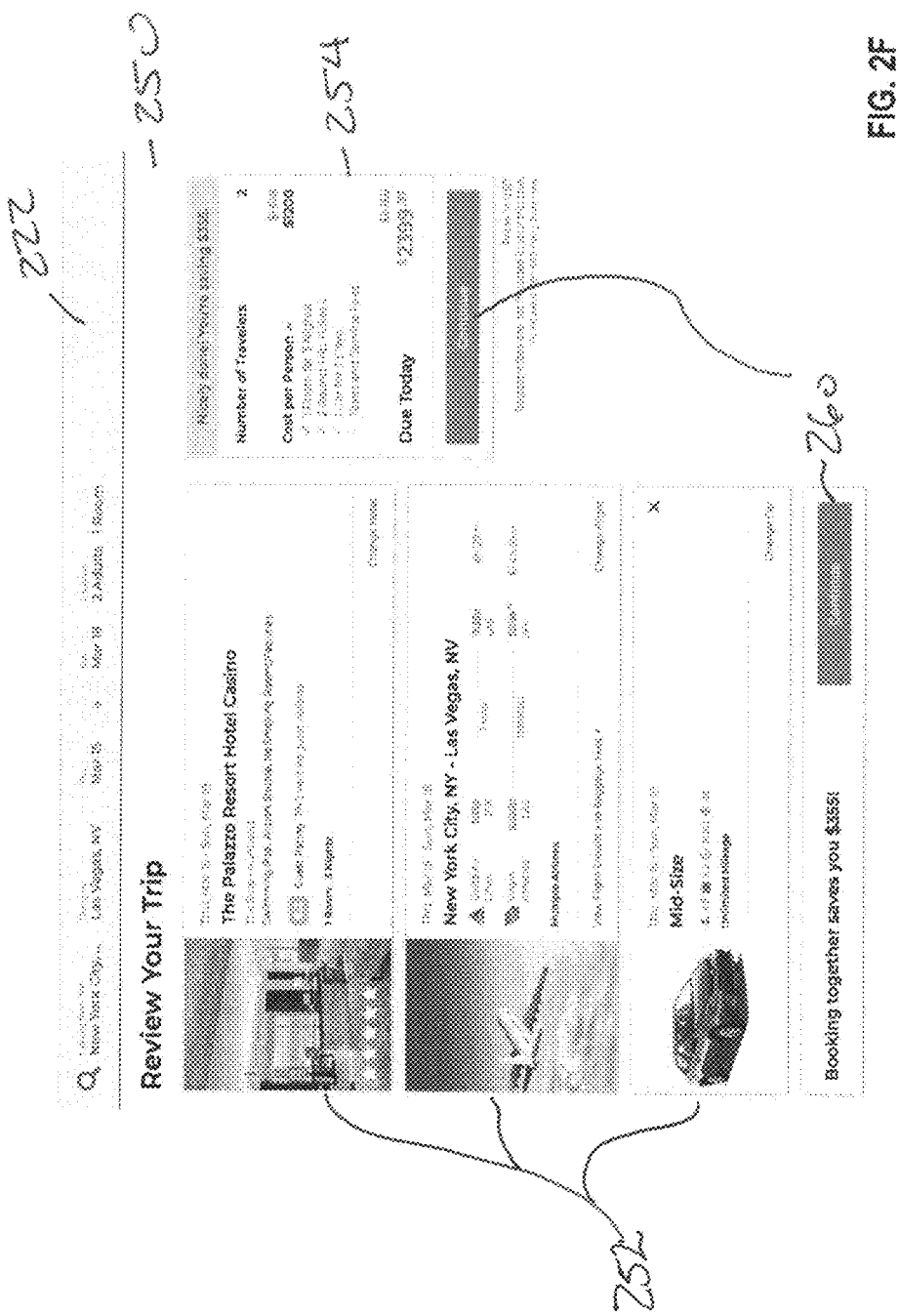

FIG. 2F illustrates an example updated trip overview screen 260. In FIG. 2F, in response to selecting the recommended car rental, trip elements 252 includes the recommended rental car that was added to the trip package. The total cost 254 displays an updated cost of the trip package.

Figure 2G:
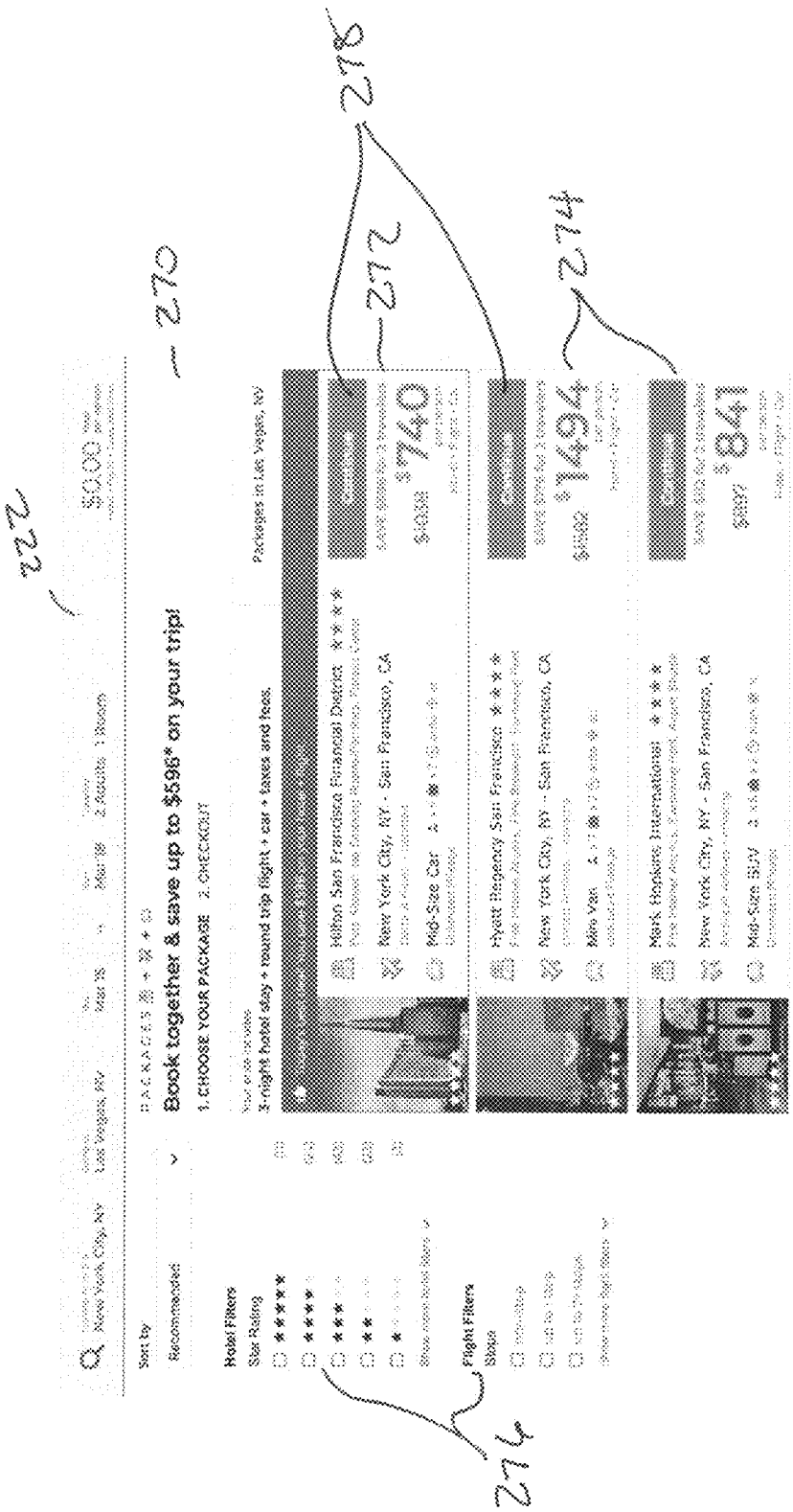

In some embodiments, rather than listing travel element options separately, sets of one or more different travel elements may be presented as suggested trip packages. FIG. 2G illustrates an example search result screen illustrating suggested trip packages. In the illustrated example, package search result screen 270 comprises a plurality of trip package selection options 272, 274. Each trip package selection option 272, 274 corresponds to a different trip package. Each trip package includes a different combination of hotel, flight, and car rental options. The details for each travel element included in the package and the price of the package is displayed in the trip package option.

In FIG. 2F, a recommended trip package selection option 272 is highlighted. The recommended trip package selection option 272 may correspond to a trip package that is selected or recommended by the intelligent assistant 114. Sort/filter widgets 276 correspond to a plurality of respective sort or filter options, for sorting and/or filtering the results. The plurality of sort or filter options, when selected, cause applying selected sort and/or filter options to the set of hotel selection options.

Additionally, each trip package selection option 272, 274 is displayed with a respective graphical Continue button 278. The graphical Continue buttons 278 are programmed, when selected, to cause submitting a request to the server computer that selects the associated trip package. In an embodiment, in response to receiving the request, the server computer may create new trip package that includes the trip elements of the associated trip package.

In an embodiment, trip packages may be selected based on customer information and the search parameters by intelligent assistant 114. Additionally, the user's preferences may affect the pricing of suggested packages or trip plans. For example, if the user prefers luxury hotel accommodations, business or first class travel, bigger or more luxurious car selections, and etc., the suggested packages may be higher priced in consideration of these preferences.

Additionally, the intelligent assistant may sort the packages based on the customer. For example, based on a particular customer's profile and booking history, the intelligent assistant may determine which packages are more strongly recommended and display those packages higher in the listing. After a user selects a recommended package, the user may modify individual travel elements included in the package, view or add additional travel elements to the package, and/or view a list of suggested alternatives for individual travel elements.

3.1 Trip Validation

When a user retrieves a trip in the trip dashboard, booking application 112 validates the trip. In an embodiment, validating the trip comprises verifying, for each trip element, element availability, element pricing, and element information. Booking application 112 may also verify trip integrity, such as connections between trip elements, trip schedule conflicts, trip element locations, and etc.

In an embodiment, trip validation is performed at various trip planning checkpoints. Trip planning checkpoints may include when a trip is created, when a trip is retrieved, or when a trip is modified such as when trip elements are added, modified, removed, or when the trip element order is changed.

Additionally or alternatively, trip validation may be performed at particular intervals. The intervals may be trip-based or trip-element based. For example, booking application 112 may be programmed or configured to validate a trip every 8 or 12 hours. As another example, trips with hotels may be validated every hour, or trips with popular travel products may be validated more frequently than trips with less popular travel products. A popular travel product may be a travel product that is being booked at a particular rate or with a particular availability remaining. Additionally or alternatively, trip elements may be individually validated at different intervals.

3.2 Adding/Modifying/Removing Trip Elements

In an embodiment, using the trip dashboard, users can view, add, modify, or remove trip elements. Booking application 112 may receive or retrieve trip element data for a trip element being added, modified, or removed. Additionally, booking application 112 may receive or retrieve a context for the trip element, such as search parameters, a set search results from which the trip element was selected, and filter parameters. Booking application 112 may use the trip element data and context to optimize the trip.

In an embodiment, booking application 112 displays suggested or alternative trip elements in response to a user adding, removing, or modifying a trip element. The displaying may be performed in real-time as the user modifies the trip.

In an embodiment, booking application 112 determines whether the trip element can be held. For example, trip product data for the trip element may indicate that the trip product can be held (reserved without booking) for a period of time. When a trip element is added or modified, booking application 112 may place a hold on the trip element.

3.4 Trip Booking

In an embodiment, the trip dashboard facilitates booking of the trip. Booking the trip comprises receiving user information, receiving payment information, and booking each trip element of the trip.

Figure 2H:
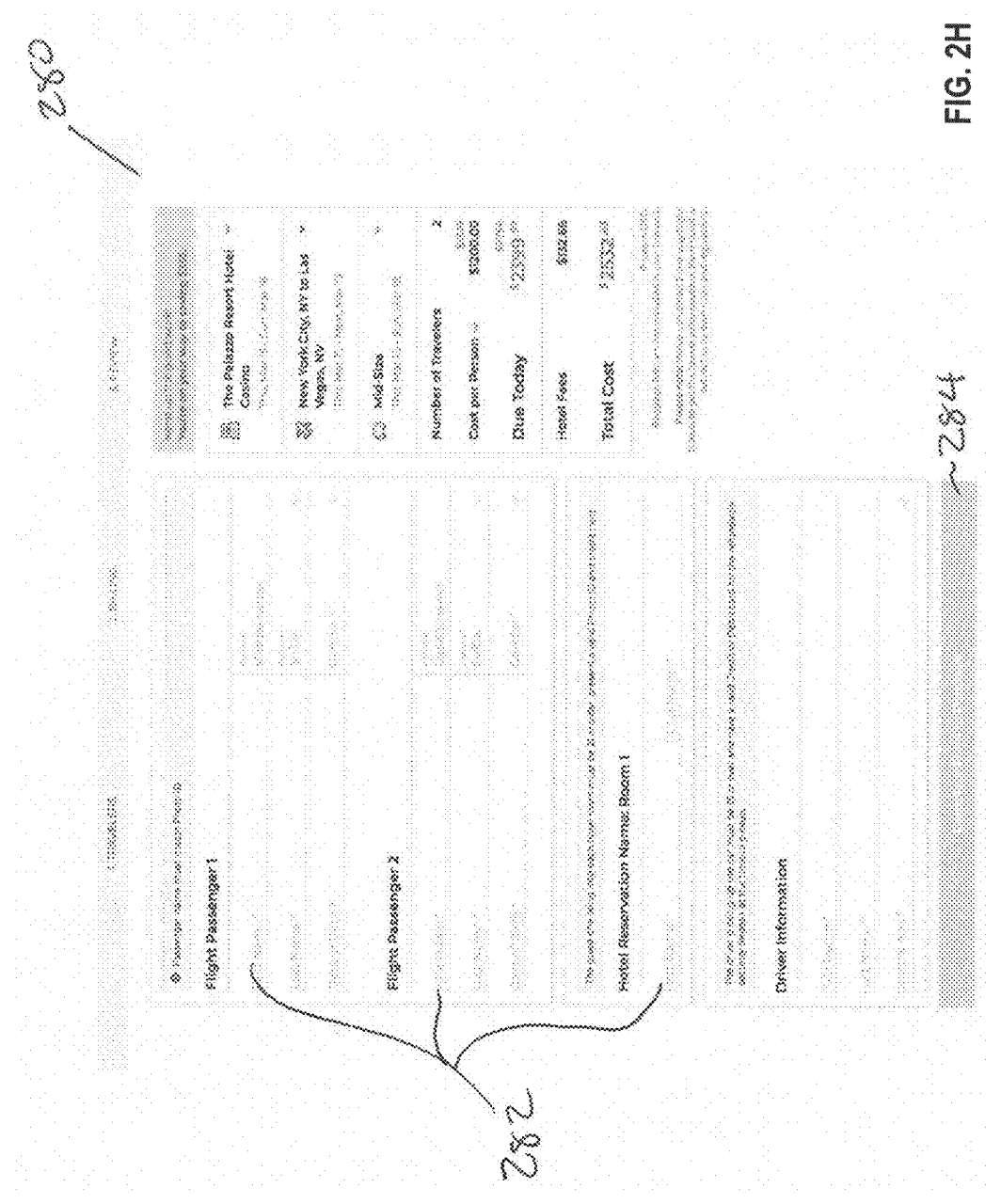

FIG. 2H illustrates an example user information booking screen. In the illustrated example, a booking form 280 comprises a plurality of input widgets 282 for entering traveler information for each trip element. A Continue button 284 is programmed, when selected, to cause submitting a request to the server computer that contains the values of widgets 282 that have been provided via input from the client computer. In an embodiment, in response to receiving the request, the server computer may store the information in association with the trip and/or user.

FIG. 2I illustrates an example payment information booking screen. In the illustrated example, a booking form 284 comprises a plurality of input widgets 286 for entering billing information and payment information. A Continue button 288 is programmed, when selected, to cause submitting a request to the server computer that contains the values of widgets 286 that have been provided via input from the client computer. In an embodiment, in response to receiving the request, the server computer may store the information in association with the trip and/or user.

Figure 2J:
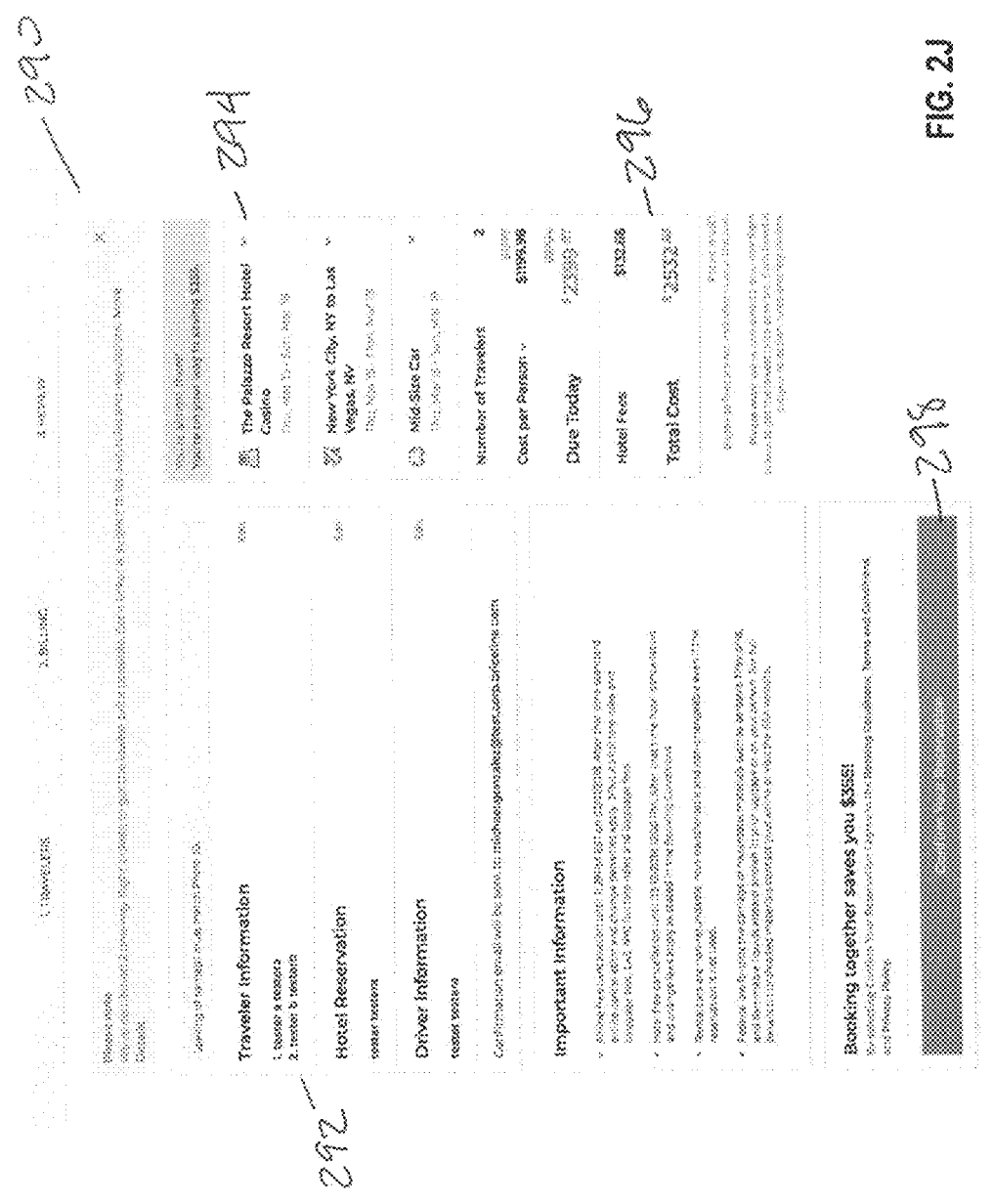

FIG. 2J illustrates an example booking review screen. The review screen 290 displays the entered traveler information 292 received from booking form 280 and 284, the selected trip elements 294 for the trip, and the total cost of the trip 296. A Confirm Your Reservation button 298 is programmed, when selected, to cause submitting a request to the server computer to book the trip. Selecting the button 298 causes the booking application to process the payment information and book each selected trip element with the provided traveler information.

In an embodiment, trip elements are validated and booked simultaneously. The trip is not booked unless all trip elements can be booked. In other embodiments, trip elements may be booked separately, and booking system 112 may notify a user if a trip element was unable to be booked. Booking system 112 may suggest alternate trip products using similar methods to those discussed above for intelligent assistant 114. If a user selects an alternate trip element, booking system 112 may modify the trip object and book the trip element.

5.0 Implementation Example—Computer Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
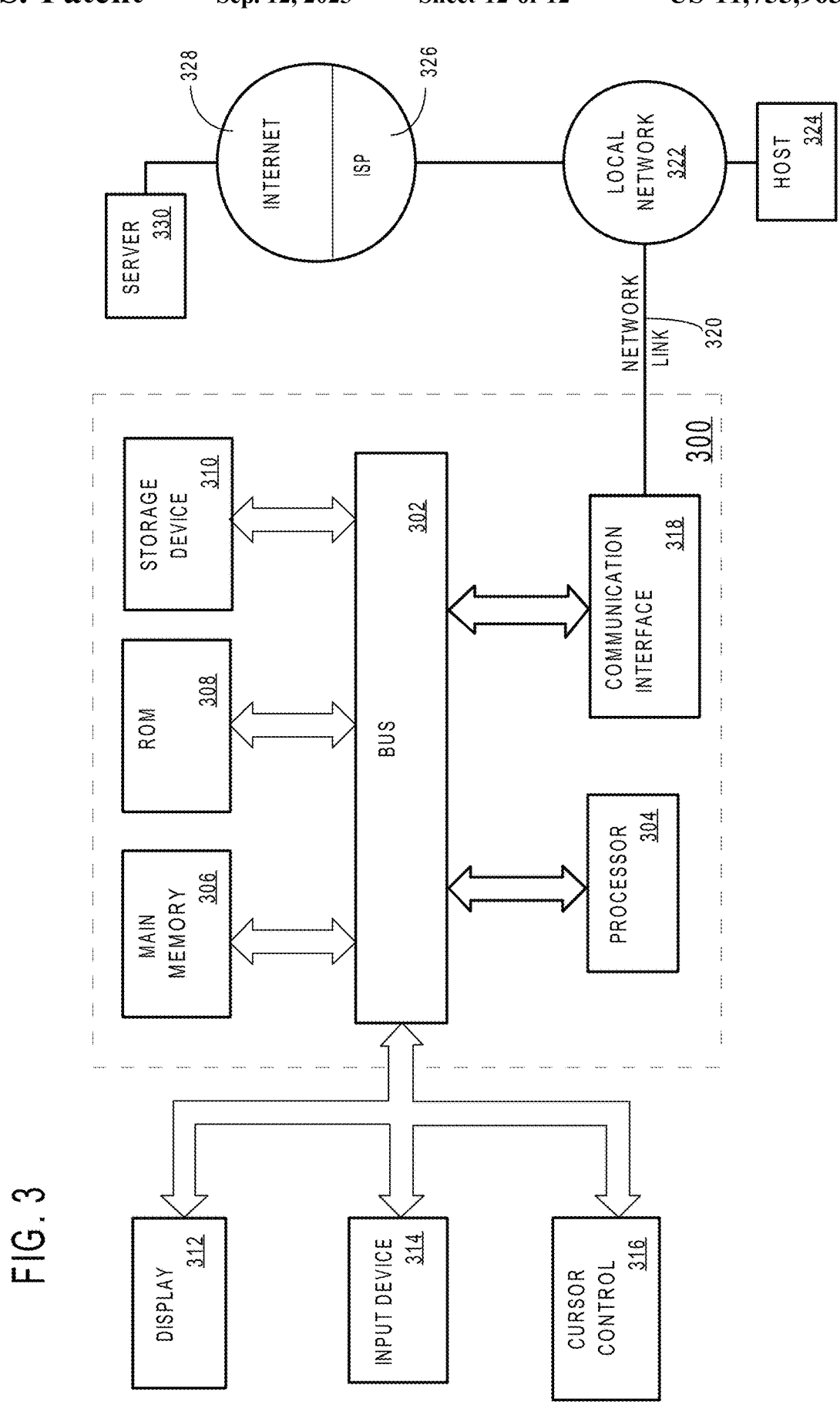
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. Display 312 may also be touch-enabled for communicating gestures, touch interactions, and other user interactions to processor 304.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method comprising:
   receiving, from a user computing device, digital data indicating one or more selected trip elements in association with a particular trip, wherein the one or more selected trip elements each represents a travel product;

adding the one or more selected trip elements to a stored data record representing the particular trip;

analyzing the one or more selected trip elements to determine, based at least on analysis of the one or more selected trip elements, an intent for the particular trip;

identifying, based on the trip intent, one or more suggested trip elements for the particular trip;

determining trip integrity between the one or more suggested trip elements;

validating the trip integrity and each of the one or more trip suggested elements;

updating the trip integrity of each of the one or more suggested trip elements at different time intervals; and causing the one or more suggested trip elements to be displayed in a graphical user interface of the user computing device.

2. The method of claim 1, wherein determining the intent for the particular trip is further based on one or more of: trip origin, trip destination, trip start date, trip end date, and trip duration.

3. The method of claim 1, wherein analyzing the one or more selected trip elements comprises determining a trip category associated with the one or more selected trip elements.

4. The method of claim 3, wherein identifying the one or more suggested trip elements is further based on the trip category.

5. The method of claim 1, wherein the particular trip is associated with one or more travelers, and wherein identifying the one or more suggested trip elements is further based on stored user information corresponding to at least one traveler of the one or more travelers.

6. The method of claim 5, wherein the particular trip is associated with a particular user, and wherein identifying the one or more suggested trip elements comprises:

determining, based at least on stored user information associated with the particular user, a plurality of similar trips, wherein each similar trip of the plurality of similar trips was booked by a user similar to the particular user, and wherein an intent for each similar trip of the plurality of similar trips is the intent for the particular trip; and selecting the one or more suggested trip elements from trip elements of the plurality of similar trips.

7. The method of claim 1, further comprising:

receiving, from the user computing device, digital data indicating selection of one or more particular suggested trip elements; and adding the one or more particular suggested trip elements to the stored data record representing the particular trip.

8. The method of claim 1, wherein the one or more suggested trip elements include a replacement trip element for a particular trip element of the one or more selected trip elements, wherein the one or more particular suggested trip elements includes the replacement trip element, and wherein the method further comprises removing the particular trip element from the stored data record representing the particular trip.

9. The method of claim 8, wherein the replacement trip element comprises a combination of two or more travel products, and wherein adding the replacement trip element to the stored data record comprises adding the two or more travel products.

10. The method of claim 1, wherein determining the one or more suggested trip elements includes:

determining a first set of one or more suggested trip elements corresponding to a first portion of the trip;

determining a second set of one or more suggested trip elements corresponding to a second portion of the trip; and matching one or more suggested trip elements of the first set with one or more suggested trip elements of the second set.

11. A system comprising:

one or more processors;

non-transitory computer-readable media storing instructions which, when executed by the one or more processors, cause:

receiving, from a user computing device, digital data indicating one or more selected trip elements in association with a particular trip, wherein the digital data indicating each of the one or more selected trip elements represents a travel product;

adding the one or more selected trip elements to a stored data record representing the particular trip;

analyzing the one or more selected trip elements to determine, based at least on analysis of the one or more selected trip elements, an intent for the particular trip;

identifying, based on the intent for the particular trip, one or more suggested trip elements for the particular trip;

determining trip integrity between the one or more suggested trip elements;

validating the trip integrity and each of the one or more trip suggested elements;

updating the trip integrity of each of the one or more suggested trip elements at different time intervals; and causing the one or more suggested trip elements to be displayed in a graphical user interface of the user computing device.

12. The system of claim 11, wherein determining the intent for the particular trip is further based on one or more of: trip origin, trip destination, trip start date, trip end date, and trip duration.

13. The system of claim 11, wherein analyzing the one or more selected trip elements comprises determining a trip category associated with the one or more selected trip elements.

14. The system of claim 13, wherein identifying the one or more suggested trip elements is further based on the trip category.

15. The system of claim 11, wherein the particular trip is associated with one or more travelers, and wherein identifying the one or more suggested trip elements is further based on stored user information corresponding to at least one traveler of the one or more travelers.

16. The system of claim 15, wherein the particular trip is associated with a particular user, and wherein identifying the one or more suggested trip elements comprises:

determining, based at least on stored user information associated with the particular user, a plurality of similar trips, wherein each similar trip of the plurality of similar trips was booked by a user similar to the particular user, and wherein an intent for each similar trip of the plurality of similar trips is the intent for the particular trip; and selecting the one or more suggested trip elements from trip elements of the plurality of similar trips.

17. The system of claim 11, wherein the instructions, when executed by the one or more processors, further cause:

receiving, from the user computing device, digital data indicating selection of one or more particular suggested trip elements; and adding the one or more particular suggested trip elements to the stored data record representing the particular trip.

18. The system of claim 11, wherein the one or more suggested trip elements include a replacement trip element for a particular trip element of the one or more selected trip elements, wherein the one or more particular suggested trip elements includes the replacement trip element, and wherein the instructions, when executed by the one or more processors, further cause removing the particular trip element from the stored data record representing the particular trip.

19. The system of claim 18, wherein the replacement trip element comprises a combination of two or more travel products, and wherein adding the replacement trip element to the stored data record comprises adding the two or more travel products.

20. The system of claim 11, wherein determining the one or more suggested trip elements includes:
   determining a first set of one or more suggested trip elements corresponding to a first portion of the trip;
   determining a second set of one or more suggested trip elements corresponding to a second portion of the trip; and
   matching one or more suggested trip elements of the first set with one or more suggested trip elements of the second set.

\* \* \* \* \*